G. A. VON SODEN-FRAUNHOFEN.
CONTROL MECHANISM.
APPLICATION FILED JUNE 28, 1920.

1,428,460.

Patented Sept. 5, 1922.
2 SHEETS—SHEET 1.

Inventor:

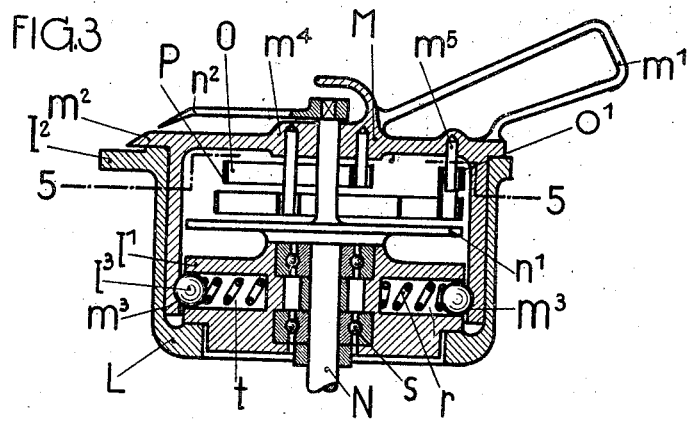
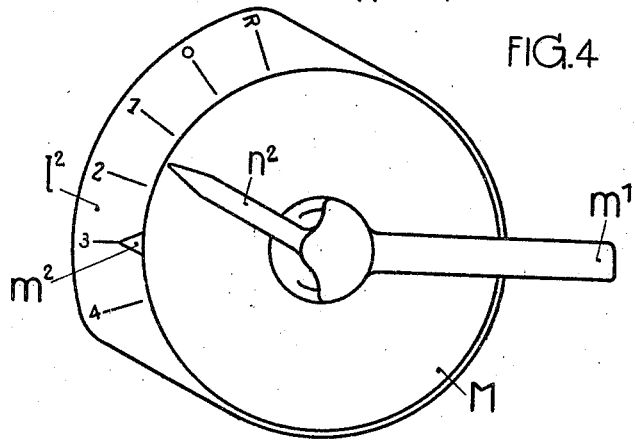
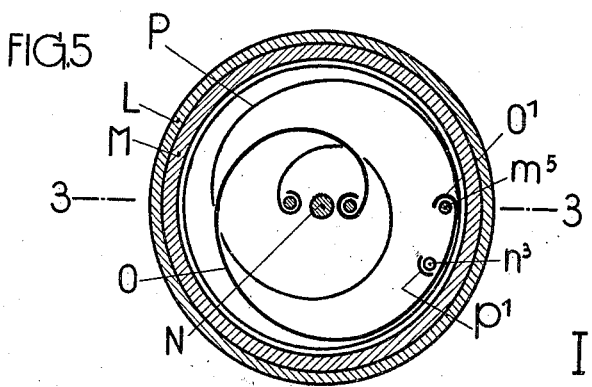

Patented Sept. 5, 1922.

1,428,460

UNITED STATES PATENT OFFICE.

GRAF ALFRED VON SODEN-FRAUNHOFEN, OF FRIEDRICHSHAFEN, GERMANY, ASSIGNOR TO THE FIRM: ZAHNRADFABRIK AKTIENGESELLSCHAFT, OF FRIEDRICHSHAFEN-ON-THE-BODENSEE, GERMANY.

CONTROL MECHANISM.

Application filed June 28, 1920. Serial No. 392,443.

*To all whom it may concern:*

Be it known that I, Graf ALFRED VON SODEN-FRAUNHOFEN, a citizen of the German Empire, residing at Friedrichshafen, Germany, have invented certain new and useful Improvements in Control Mechanism (for which I have filed applications in Germany April 12 and May 13, 1919), of which the following is a specification.

My invention refers to control mechanisms such as employed for instance in adjusting the different speeds of machine tools or motor vehicles or in throwing off bombs of different kinds from airships or aeroplanes. The invention has special reference to control mechanisms provided with means for effecting a preliminary adjustment by preparing the future position of the principal controlling member, before releasing it or changing it over, by adjusting an auxiliary member.

The devices of this kind as hitherto used and having the principal controlling member operatively connected with the auxiliary member by springs involved the serious drawback that the displacement of the two members from their relative position of equilibrium resulted not only in an increase of tension of one, but also in a diminution of tension of the other spring. In consequence thereof the shifting of the principal member, after it had been released, into the new position of equilibrium prepared by the auxiliary member very frequently did not take place with sufficient vigour and exactness.

It is an object of the present invention to obviate this drawback. To this end provision is made that the tension of the spring inserted between the principal member and the auxiliary member operatively preparing its adjustment be reduced to its minimum, which is equal to the preliminary tension imparted to the spring from the beginning as soon as the principal member is carried into the position prepared by the auxiliary member. While a new position is being prepared by the auxiliary member, the tension is merely increased without any diminution of tension taking place on the other side, resulting in a quick and vigorous transition of the principal member into its new position as soon as it has been released.

As the minimum tension is equal to the preliminary tension, it may be chosen as high as desired in order to cause the principal member to be carried into the prepared position with any desired vigour.

Another drawback connected with the older devices consisted therein that the actual position of the principal member could be read, if at all, only off an indicating device apportioned to the principal member and separated from the auxiliary member. This drawback became especially apparent in control mechanisms for change speed gears of motor vehicles inasmuch as the driver could not ascertain with one glance the momentous position of the principal member and the position of the auxiliary member determining the future position of the former.

This drawback is remedied by the invention by causing both members to transfer their actual position onto a common indicating device. This device is preferably arranged on the auxiliary member, at least in those cases where the adjustment of this member is effected directly by hand. According to the invention after the principal member has been released the movable parts of the indicating device, will register quickly and steadily under the action of the vigorous spring action at the place corresponding to the registering positions of the principal and auxiliary members.

In principle it is of no avail whether a single spring or a plurality of springs acting in the same sense or counteracting each other are employed. An especially advantageous construction comprising two springs operatively connecting the principal and the auxiliary members is obtained if the two springs are made to counteract each other, each spring resting with one end against one of the members, while the other end contacts either with another stop on the same member or with a stop on the other member or simultaneously with both these stops. By the free end resting against the second stop of the first mentioned member the minimum tension of the spring is determined while the single stop of the second member serves to create the additional tension.

In the drawings affixed to this specification and forming part thereof three different modifications of a device according to the present invention are illustrated in a diagrammatic manner. In the drawings Fig. 1 is a plan partly in section, of a control mechanism provided with a single spring.

Figs. 3 to 5 illustrate a third modification comprising two spiral springs, and designed for a four step change speed gear, Fig. 3 being a vertical cross-section,

Fig. 4 a plan,

Fig. 5 a horizontal section.

Figure 1:
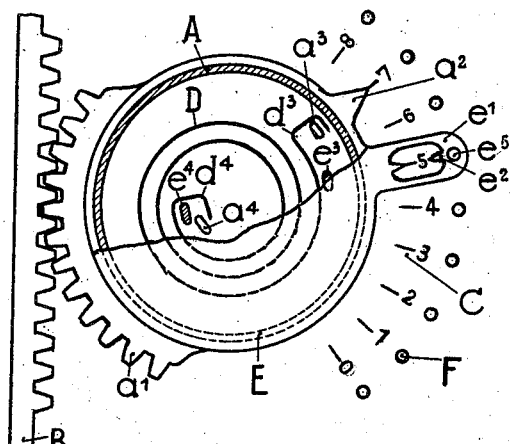

Referring to Fig. 1 A is a cylindrical casing, $a^1$ is a toothed quadrant fixed thereto and B is a rack in gear therewith and serving to effect the adjustment. $a^2$ is a pointer fixed to the casing A and C is a scale cooperating with said pointer. $a^3$ and $a^4$ are bolts secured to the bottom of casing A, bolt $a^3$ being placed near its circumference and bolt $a^4$ near its center. The two bolts are arranged in line on a diameter of the casing and are designed to serve as abutments for a powerful spiral spring located in the casing. A cap E adapted to be turned relatively to the casing by means of a handle $e^1$ carries a pointer $e^2$ cooperating also with the scale C. Two bolts $e^3$ and $e^4$ are further fixed to the cap, bolt $e^3$ being placed near its circumference and bolt $e^4$ near its center, the said bolts being directed from the cap inwards towards the bottom of the casing A. The bolts $e^3$, $e^4$ are disposed in line on the same diameter at a distance equal to the distance between the bolts $a^3$ and $a^4$, the arrangement being such that on the cap being turned relatively to the casing the bolts $e^3$, $e^4$ are free to pass clear of bolts $a^3$, $a^4$. The ends $d^3$, $d^4$ of the spiral spring D are shaped so as to embrace each two bolts ($a^3$, $e^3$ and $a^4$, $e^4$ respectively), whenever these bolts are arranged all on the same diameter and in proximity to each other. The pointers are placed on the diameter passing through the four bolts.

The spring D is placed in the casing A with a preliminary tension which is also its minimum tension kept up as long as the pointers $a^2$ and $e^2$ lie on the same diameter. If by locking the rack B the casing A is held in the position shown in the drawing with the pointer $a^2$ on division 7 and cap E is turned in the sense of the clock until pointer $e^2$ is in front of division 5, bolt $a^3$ gets out of range of the spring end $d^3$ still held by bolt $a^3$, but at the same time bolt $e^4$ carries the spring end $d^4$ along in lifting it off bolt $a^4$ and thereby increases the spring tension. If now the cap is locked in its position for instance by inserting a pin $e^5$ projecting through handle $e^1$ in one of a row of holes F, and the rack B is then released, casing A will be turned under the action of the spring D under increased tension in the sense of the clock until its pointer $a^2$ coincides with pointer $e^2$ of the cap and division 5 of the scale, the spring tension being thereby reduced to its initial value. On the other hand the casing A will not pass beyond division 5; for although bolt $a^3$ might get relieved of the pressure exerted upon it by the spring end $d^3$ resting against bolt $e^3$, bolt $a^4$ would lift at the same time spring end $d^4$ off bolt $e^4$ and thus increase the tension of the spring. It is thus made apparent that it does not matter in which sense the cap E is turned relatively to the casing A, for in every case spring D is stretched more strongly so as to tend to make the pointers on the casing and the cap coincide.

Figure 2:
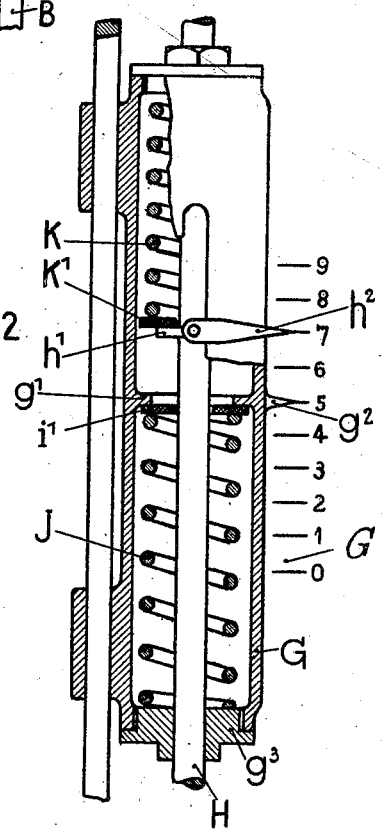
Fig. 2 is an elevation, partly in longitudinal section, of another form provided with two coil springs.

In the mechanism illustrated in Fig. 2 G is a casing displaceably mounted on the striker rod H leading to the change gear. The casing is divided in two equal halves by an internal flange $g^1$, a flange $h^1$ disposed on rod H being free to pass through the gap surrounded by flange $g^1$. Coil springs J and K enclosed in the casing rest from opposite sides against the flange $g^1$, washers $i^1$ and $k^1$ being inserted whose external diameters are greater than the diameter of the gap encircled by flange $g^1$, while their inner diameters are smaller than that of flange $h^1$. Casing G has a pointer $g^2$ fixed to it in line with flange $g^1$, and a scale $G^1$ is disposed in front thereof. Another pointer $h^2$ is fixed to the flange $h^1$ on striker rod H. If the preliminary tension of springs J and K is equal, the pointers $h^2$ and $g^2$ will register provided that casing G and rod H are freely movable relativley to each other and flange $h^1$ is in line with flange $g^1$. If now rod H is fixed in the position shown in the drawings, where pointer $h^2$ is placed in front of division 7, and if casing G is displaced so that pointer $g^2$ registers with division 5, the preliminary tension of spring J is kept up unaltered, but the tension of spring K is increased by compression. In consequence thereof striker rod H on being released will be shifted into position 5 without however passing beyond it, for in this case spring J would be placed under increased tension. Thus in this mechanism as well each displacement of the casing from its position of rest relatively to the flange $h^1$ on rod H causes one spring to be placed under higher tension without the tension of the other spring being diminished.

In the mechanism illustrated in Figs. 3, 4 and 5 a cup-shaped cap M is displaceably inserted in a cylindrical casing L having its bottom $l^1$ removably arranged therein. Cap M can be turned relatively to the casing by means of a handle $m^1$, a pointer $m^2$ fixed to it passing in front of a scale disposed on a flange $l^2$ of the casing. The bottom $l^1$ has coil springs $r$ radially disposed in radial recesses $t$, and balls $l^3$ acted upon by said springs are pressed into recesses $m^3$ of the cap M whenever the pointer $m^2$ registers with one of the divisions of the scale, the cap being then secured against unintentional displacement. A control shaft N passes through a central boring in the bottom $l^1$, ball bearings $s$ being inserted between them. Shaft N leads to the change speed gear and serves to throw in one or the other speed according to the angle it is being turned through. $n^1$ is a spring plate fixed on shaft N and resting on the bottom $l^1$. The upper end of the shaft projects through the cover $m^4$ of cam M and carries a pointer $n^2$ registering with the pointer $m^2$ on said cap whenever the spiral springs O and P are under normal tension, one end of each spring being fixed to the cover $m^4$. The springs are wound in an opposite sense, and are disposed one above the other. Their free ends $o^1$ and $p^1$ embrace bolts $m^5$ and $n^3$ respectively, bolt $m^5$ being fixed in the cover $m^4$ of the cap M, while bolt $n^3$ is disposed on spring plate $n^1$ fixed to shaft N. As long as the pointers $m^1$ and $n^2$ are registering, bolts $m^5$ and $n^3$ register also and the free ends $o^1$ and $p^1$ of the springs are broad enough to embrace each both bolts, one end from one side and the other end from the other. The springs O and P are fixed on the cover $n^4$ with equal preliminary tension in such a manner that their curved free ends $o^1$ and $p^1$ rest from different sides against bolts $m^5$. The control shaft N is then passed through the cover $m^4$ in the position where bolt $n^3$ forms the continuation of bolt $m^5$. Now the pointer $n^2$ is placed on the upper end of the shaft so as to register with the pointer $m^2$ and after cap M has been inserted in casing L and the lower end of shaft N has been connected with the change speed gear the device is ready for use.

Apparently the springs O and P have their minimum tension, which is equal to their preliminary tension, when the pointers $m^2$ and $n^2$ and the bolts $m^5$ and $n^3$ are registering. For if the control shaft is fixed in its position and the cap M is turned by aid of handle $m^1$ in one sense or the other, bolt $m^5$ will get free of one of the spring ends such as $o^1$ only to displace the spring end $p^1$ so as to increase the tension of said spring, while bolt $m^5$ prevents the other spring (O) from unwinding. By turning the cap in opposite direction the tension of spring O is increased in a similar manner, while spring P retains its preliminary tension.

The tension of the springs $r$ acting on the balls $l^3$ is such that the cap will stop in any position imparted to it by hand independently of the actual position of shaft N, but will allow of being carried into any other position by aid of the handle.

I wish it to be understood that I do not desire to be limited to the exact details of construction, shown and described, for obvious modifications will occur to a person skilled in the art.

I claim:—

1. In a device of the kind described in combination, two members movable relatively to each other, a spring under preliminary tension operatively connecting said members and adapted, on being placed under increased tension by movement of one member, to cause the other member to follow this movement whereby the tension of said spring is reduced to its minimum which is equal to its preliminary tension, a fixed scale and pointers on both members adapted to coincide when said springs are under minimum tension.

2. In a device of the kind described in combination, a shaft and a disk movable concentrically with said shaft, two springs under preliminary tension adapted to counteract each other operatively connecting said shaft and said disk, one end of each spring abutting against a stop on said disk, each spring being adapted, on being placed under increased tension by a movement of said disk, to cause said draft to follow this movement, whereby the tension of said springs is reduced to its minimum which is equal to its preliminary tension, a fixed scale and pointers on both members adapted to register when said springs are under minimum tension.

3. In a device of the kind described in combination, a shaft and a disk movable concentrically with said shaft, two springs under preliminary tension adapted to counteract each other operatively connecting said shaft and said disk, one end of each spring abutting against a stop on said disk, each spring being adapted, on being placed under increased tension by a movement of said disk, to cause said shaft to follow this movement, whereby the tension of said springs is reduced to its minimum which is equal to its preliminary tension, and resilient means for locking said disk in its positions relatively to said shaft.

In testimony whereof I affix my signature.

Graf ALFRED v. SODEN-FRAUNHOFEN.